US012778833B2

(12) United States Patent
Barr

(10) Patent No.: US 12,778,833 B2
(45) Date of Patent: Nov. 3, 2026

(54) GRIP THERAPY DEVICES AND REHABILITATION SYSTEMS

(71) Applicant: Plasticity Neurotherapeutics, LLC, Evansville, IN (US)

(72) Inventor: Luke K Barr, Evansville, IN (US)

(73) Assignee: Plasticity Neurotherapeutics, LLC, Evansville, IN (US)

( * ) Notice: Subject to any disclaimer, the term of this patent is extended or adjusted under 35 U.S.C. 154(b) by 789 days.

(21) Appl. No.: 17/950,262

(22) Filed: Sep. 22, 2022

(65) Prior Publication Data

US 2023/0099198 A1 Mar. 30, 2023

Related U.S. Application Data

(63) Continuation of application No. 29/809,946, filed on Sep. 30, 2021, now Pat. No. Des. 1,090,742.

(60) Provisional application No. 63/250,527, filed on Sep. 30, 2021.

(51) Int. Cl.
*A61H 1/02* (2006.01)

(52) U.S. Cl.
CPC ... *A61H 1/0285* (2013.01); *A61H 2201/1638* (2013.01); *A61H 2201/1666* (2013.01); *A61H 2201/1685* (2013.01)

(58) Field of Classification Search
CPC ... A63B 23/16; A63B 21/4023; A63B 21/072; A63B 2023/006; A63B 21/4035; A63B 21/4039; A63B 21/4043; A61H 7/00; A61H 7/001; A61H 1/0285; A61H 2201/1638; A61H 2201/1666; A61H 2201/1685
See application file for complete search history.

(56) References Cited

U.S. PATENT DOCUMENTS

| | | | | | |
|---|---|---|---|---|---|
| 5,725,484 | A * | 3/1998 | Burnham | A61H 15/0092 | 601/134 |
| 11,357,688 | B1 * | 6/2022 | Metzger | A61H 1/008 | |
| 2002/0094913 | A1 * | 7/2002 | Valentino | A63B 21/00069 | 482/45 |
| 2002/0165070 | A1 * | 11/2002 | Pullaro | A63B 21/0722 | 482/109 |
| 2007/0167298 | A1 * | 7/2007 | Bystrom | A63B 23/14 | 482/45 |
| 2010/0267523 | A1 * | 10/2010 | Wilkinson | A63B 21/0726 | 482/45 |
| 2016/0136032 | A1 * | 5/2016 | Dakides | A61H 15/0092 | 601/84 |
| 2017/0043205 | A1 * | 2/2017 | Wilson | A63B 21/0435 | |
| 2020/0060924 | A1 * | 2/2020 | Thornburg | A61H 1/008 | |
| 2020/0138664 | A1 * | 5/2020 | Hanson | A61H 7/007 | |

* cited by examiner

*Primary Examiner* — Timothy A Stanis
*Assistant Examiner* — Matthew R Moon
(74) *Attorney, Agent, or Firm* — Brannon Sowers & Cracraft PC

(57) ABSTRACT

Hand grip therapy devices and systems for rehabilitation system for increasing the functionality and/or strength in a hand compromised by disease, injury, and the like. In one embodiment the hand grip therapy device includes a dodecahedron portion which is gripped by a hand having less functionality and a prism or paddle portion which is gripped by a hand having greater functionality, the device then being manipulated in a therapeutic manner using both hands.

15 Claims, 3 Drawing Sheets

GRIP THERAPY DEVICES AND REHABILITATION SYSTEMS

CROSS REFERENCE TO RELATED APPLICATIONS

The present application claims priority to U.S. Provisional Patent Application No. 63/250,527, filed on Sep. 30, 2021, and to U.S. Design patent application No. 29/809,946, filed on Sep. 30, 2021, the disclosures of which are incorporated herein by reference.

TECHNICAL FIELD

The present disclosure relates generally to physical therapy devices and rehabilitation systems and more particularly to hand grip therapy devices and rehabilitation systems associated therewith.

BACKGROUND

Patients who suffer injuries affecting the hand and/or forearms typically may suffer from reduced functionality of the affected hand. Such limitations may include reduced grip strength, flexibility, and fine motor control. A variety of tools and techniques have been developed to help patients regain function but most of these tool and techniques have shown limited effectiveness and many have drawbacks in their manner of application. One example of tools and methods for hand rehabilitation are shown in U.S. Pat. No. 8,096,924 to Mittelsteadt which discloses a variety of therapy tools having differing sizes and shapes designed to be manipulated by a patient in conjunction with a resistance putty to simulate fine and gross motor skills. While this may be useful for some conditions, having to use the disclosed devices with a resistance putty limits the times and places a patient may perform their therapy exercises. Such a system also only engages a single hand and does nothing to improve coordination for tasks which require two hands. While these and other devices and methods may assist some patients with developing and/or regaining functionality of a hand there remains ample room for improvement and development for alternative devices and strategies for patients suffering from loss of strength and functionality of the hands.

SUMMARY OF THE INVENTION

In one aspect, a method of performing therapy of the hand by providing a patient with a therapy device having a first portion and a second portion, the first portion being a dodecahedron portion and the second portion being a prism portion in one example, the dodecahedron portion to be gripped by a hand having lesser functionality and the prism portion being gripped by a hand having greater functionality, a series of predetermined therapeutic motions of both the dodecahedron portion and the prism portion which have a therapeutic effect on the hand having lesser functionality. The therapeutic motions including rotational motions, linear motions in the x-axis, linear motions in the y-axis, linear motions in the z-axis, and combinations thereof. In other aspects the prism portion further includes a first portion and a second portion separated by a bend portion and may have a cross sectional area having eight sides or four sides. In still other aspects the hand having greater functionality is the hand of a therapist or someone other than the patient having a hand of lesser functionality.

In another aspect, a method of performing therapy of the hand by providing a patient with a therapy device having a dodecahedron portion and a first paddle portion, in one example the dodecahedron portion to be gripped by a hand having lesser functionality and the first paddle portion being gripped by a hand having greater functionality (which may be the patient's hand or the hand of a therapist or someone other than the patient), a series of predetermined therapeutic motions of both the dodecahedron portion and the first paddle portion which have a therapeutic effect on the hand having lesser functionality. The therapeutic motions including rotational motions, linear motions in the x-axis, linear motions in the y-axis, linear motions in the z-axis, and combinations thereof. In other aspects the first paddle portion further includes a first portion and a second portion separated by a bend portion and may have a cross sectional area having eight sides or four sides. In another example the first paddle portion is removed from the dodecahedron portion and replaced with a second paddle portion having a different cross section than the first paddle portion, the dodecahedron portion is then gripped by a hand having lesser functionality and the second paddle portion being gripped by a hand having greater functionality.

In still another aspect therapeutic device for use in bimanual therapy is disclosed which includes a dodecahedron portion having an attachment point and a paddle portion having a first portion and a second portion separated by a bend portion, the first paddle portion further including an attachment point that is removably attachable to the attachment point of the dodecahedron portion. The paddle portion may have a cross sectional area having eight sides or four sides. The first paddle portion being generally longer than the second paddle portion which is disposed at an angle of about 30 degrees from the first paddle portion by the bend portion.

DETAILED DESCRIPTION

The hand grip therapy devices and systems disclosed herein include devices which encourage engagement using both hands to improve the strength and functionality of a hand which has been compromised due to injury, disease, or other conditions. The combination of unusual shapes and therapeutic motions mimics real world activities which commonly require coordination between both hands. The use of a single device which engages both of a patient's hands allows a patient to not only conduct therapy activities in controlled setting with a therapist but also in the real world without assistance while engaged in other activities (e.g., while riding public transport, while waiting an appointment, while reading or watching media, and the like).

Figure 1:
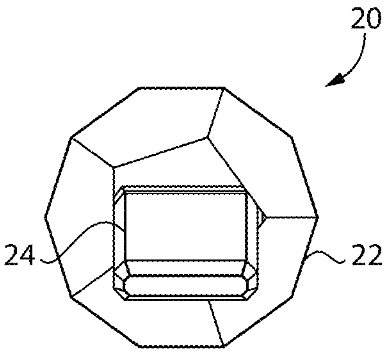
FIG. 1 is a front view of a grip therapy device according to one embodiment.
Figure 2:
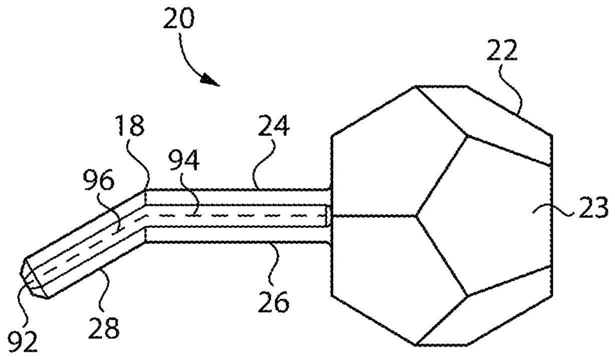
FIG. 2 is a left side view of the grip therapy device shown in FIG. 1.
Figure 3:
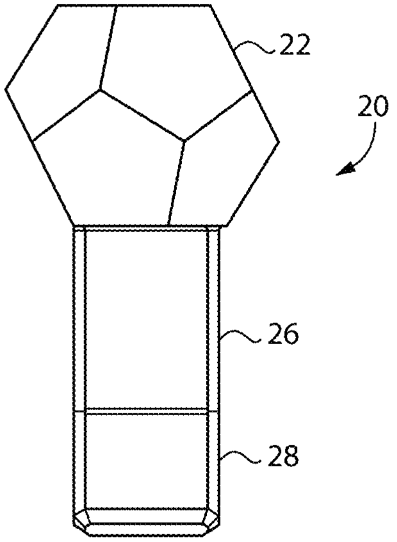
FIG. 3 is a bottom view of the grip therapy device shown in FIG. 1.
Figure 4:
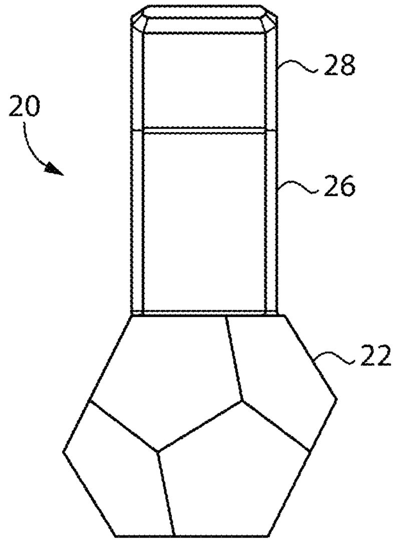
FIG. 4 is a top view of the grip therapy device shown in FIG. 1.
Figure 5:
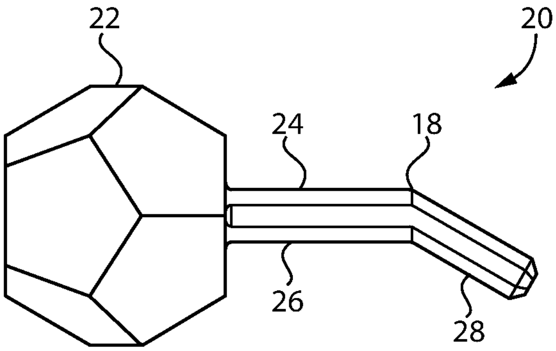
FIG. 5 is a right side view of the grip therapy device shown in FIG. 1.
Figure 6:
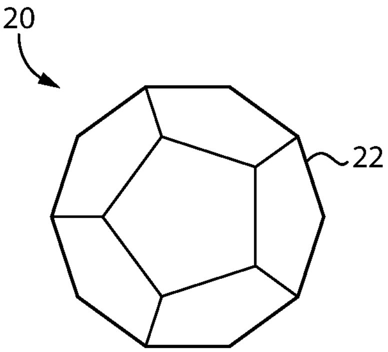
FIG. 6 is a rear view of the grip therapy device shown in FIG. 1.
Figure 7:
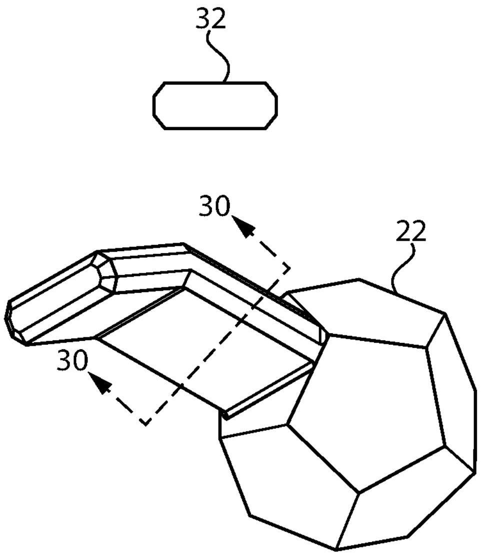
FIG. 7 is a left perspective view of the grip therapy device shown in FIG. 1.
Figure 8:
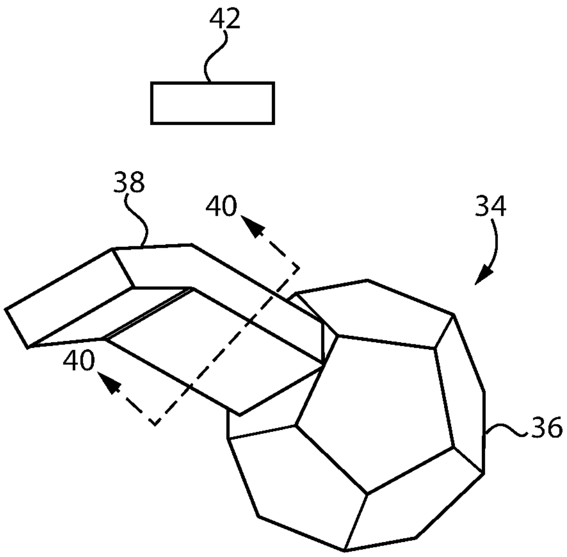
FIG. 8 is a left perspective view of a grip therapy device according to another embodiment.

Referring now to FIGS. 1-7, a hand therapy device 20 according to one embodiment is shown. The hand therapy device 20 includes two complex shapes fused together to form the larger device. In this particular example, the two complex shapes include a dodecahedron portion 22 having twelve flat facets 23 and faceted prism portion 24 having a cross section 32 along line 30 having eight sides. In other examples the two complex shapes may have more or fewer faces or facets as desired. The two complex shapes of the hand therapy device 20 may be thought of as forming a grip or knob (the dodecahedron 22) and a paddle or handle (the prism 24). The prism 24 portion also includes a first (proximal) portion 26 and a second (distal) portion 28 joined by an elbow or bend portion 18. The exact length of the first portion 26 and second portion 28 relative to one another may vary as desired. In one example the first portion 26 is longer than the second portion 28. The angle of the bend portion 18 may also vary as desired. In this particular example the bend portion 18 is approximately thirty (30) degrees, but bend portions of greater or lesser angles are also contemplated. FIG. 8 shows an alternative embodiment of a hand therapy device 34 formed from two complex shapes. In this example, one complex shape is a dodecahedron portion 36 and the other complex shape is a rectangular solid portion 38 having a cross section 42 along line 40 having four sides.

Figure 10:
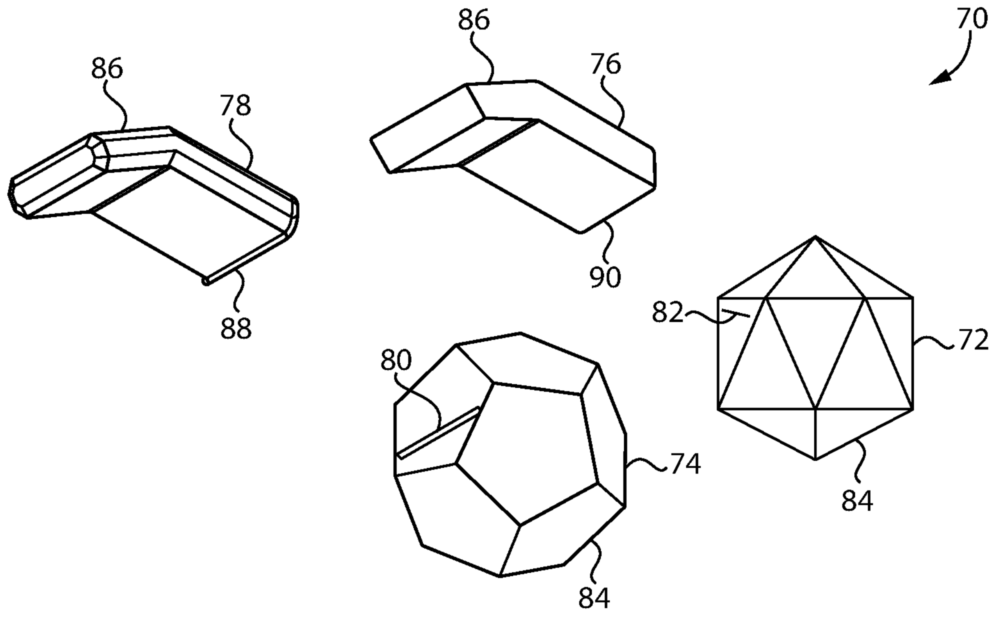
FIG. 10 shows a kit of grip therapy devices according to one embodiment.

Further embodiments of hand therapy devices may include two or more different complex shapes which are removably mountable to one another. In the example shown in FIG. 10 the hand therapy devices 70 include a first complex shape 84 designed for gripping and manipulation by the hand having greater functionality and a second complex shape 86 designed for gripping an manipulation by the hand having lesser functionality. In this particular example, the first complex shape 84 are shown as a dodecahedron shaped solid 74 and an icosahedron shaped solid 72 although solid forms of other shapes and sizes are also contemplated. Each of the first complex shapes 84 include an attachment point 80, 82 where a second complex shape may be removably attached. The second complex shape 86 are shown as a paddle portion 78 having an eight sided cross section and a paddle portion 76 having a four sided cross section. Each of the second complex shapes 76, 78 include an attachment an attachment point 90, 88 for removable attachment to the attachment point 80, 82 of a first complex shape 74, 72. It can be noted from FIG. 2 that distal portion 28 may include a distal portion terminal tip 92. It may further be noted that proximal portion 26 and distal portion 28 may be angled relative to one another such that proximal portion 26 extends in a first direction, and distal portion 28 extends in a second direction and is separated from proximal portion 26 by bend portion 18 such that an angle is defined between the first direction and the second direction. Proximal portion 26 may define a proximal portion center axis 94 that is parallel to the first direction, and distal portion 28 may define a distal portion center axis 96 that is parallel to the second direction, and distal portion center axis 96 intersects proximal portion center axis 94 at a location within bend portion 18 and extends through distal portion terminal tip 92 at a location that is spaced radially outward of proximal portion center axis 94.

The exact size and/or shape of each of the two complex shapes (overall and relative to one another) which make up a hand therapy device according to the present disclosure may vary as desired. Optionally, each of the complex shapes and/or the device may be custom made for an individual patient based on a variety of factors. Such factors may include a patient's hand size, the nature/extent of a hand's limitation(s), the nature of the therapy being practiced, and the like. In some examples the size and/or shape of a hand therapy device may be altered over the full course of therapy. For example, a patient with a severe grip deficiency may begin therapy with a hand therapy device having smaller/narrower handle portion then change to a device having a larger/wider handle portion as their grip improves. The hand therapy devices disclosed herein may be constructed as a single piece or alternatively as subassemblies which are then fitted together. The devices and/or subassemblies may be made from a variety of suitable materials (plastics, wood, metal, composites, and the like) and may be manufactured using any suitable method such as molding, casting, turning, or using additive fabrication methods (jetting, bed fusion, and the like).

INDUSTRIAL APPLICABILITY

Figure 9:
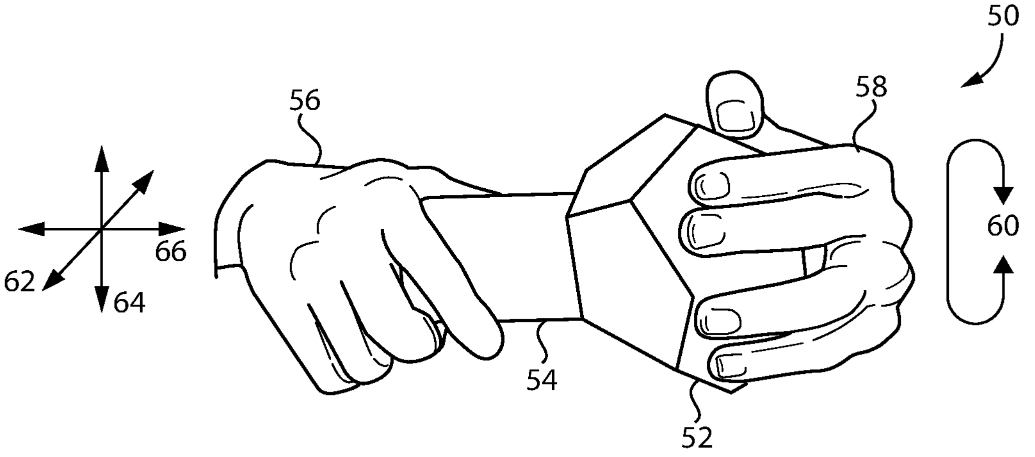
FIG. 9 shows a grip therapy device according to one embodiment in use by a patient.

FIG. 9 shows an example of a hand therapy device 50 being used for therapeutic purposes by a patient. In this particular example, the hand therapy device 50 includes a dodecahedron portion 52 and a prism portion 54. The patient grips the dodecahedron portion 52 with their compromised hand 58 which requires therapy and grips the prism portion 54 with their uncompromised hand 56 (or alternatively with the hand which has superior function). In other examples, the patient may grip one portion of the therapy device with a compromised hand while a second person (therapist, physician's assistant, partner, or the like) grips the other portion of the therapy device. Such an arrangement may be used where a patient has two compromised hands or is otherwise unable to grip a portion of the therapy device with sufficient strength or lacks sufficient dexterity so as to conduct effective therapy for the compromised hand.

Once the therapy device 50 is gripped the patient may begin a series of therapeutic motions or maneuvers of the device. Such motions or maneuvers may include, but are not limited to, circular or rotational motions 60 as well as motions in the x-axis 62, y-axis 66, z-axis 64, and combinations thereof. Such motions may be predetermined such as by a therapist or physician, freely selected by the patient, or combinations thereof. The devices disclosed herein may also be used in combination with other types of therapeutic motions and activities.

The complex and differing shapes of the therapy device provide novel stimulus and intuitively encourages motor engagement with both hands which mimics real world complex tasks which often require coordination between hands. Similarly, the size and rigidity of the structures of the device mimic normal objects encountered in everyday activities. The bimanual activity encouraged by the device as well as the novel stimuli it generates in a patient's hands have been demonstrated to boost both learning and neuroplasticity which improves functionality and recovery of a compromised hand.

In some instances, the size, shape, and/or configuration of the therapy device(s) may change over the course of therapy for a particular patient. For example, a patient may begin therapy with a device that is easier to grasp or manipulate (e.g., because it has more facets and/or is larger). As the therapy progresses and the patient's grip strength and coordination improves the starting therapeutic device may be exchanged for one which is more difficult to grasp or manipulate (e.g., because it fewer or no facets and/or is smaller). In other examples, the first and second complex shapes of the therapeutic device may be separable such that one complex shape may be changed while the other remains constant depending on the needs of a particular patient. In other examples one or both of the complex shapes may be irregularly shaped, have different textures, and/or have additional features which are tailored to a particular patient's therapeutic needs. For example, a patient may have a hand injury which makes gripping a hard object painful so a complex shape having a padded surface may be used until the injury heals, then a complex shape having a hard surface may be substituted.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different instruments, implements, and the like having a variety of different structures than those specifically described herein. Other aspects, features, and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A method of performing bimanual therapy, comprising:

providing to a patient a therapy device having a first portion and a second portion;

gripping the first portion with a hand having lesser functionality and gripping the second portion with a hand having greater functionality; and performing a predetermined sequence of therapeutic motions of the first portion and the second portion;

wherein the first portion is a dodecahedron solid;

wherein the second portion is a paddle having a proximal portion and a distal portion, the proximal portion and the distal portion being angled relative to one another such that the proximal portion extends in a first direction, and the distal portion extends in a second direction and is separated from the proximal portion by a bend portion such that an angle is defined between the first direction and the second direction;

wherein the proximal portion defines a proximal portion center axis parallel to the first direction, and the distal portion defines a distal portion center axis parallel to the second direction, and the distal portion center axis intersects the proximal portion center axis at a location within the bend portion, and extends through a distal portion terminal tip that is spaced radially outward of the proximal portion center axis.

2. The method of claim 1, wherein the therapeutic motions include rotational motions, linear motions in the x-axis, linear motions in the y-axis, linear motions in the z-axis, and combinations thereof.

3. The method of claim 1, wherein the second portion is a paddle having an eight sided cross sectional area.

4. The method of claim 1, wherein the second portion is a paddle having a four sided cross sectional area.

5. The method of claim 1 wherein the hand having greater functionality is a hand of someone other than the patient.

6. The method of claim 1, wherein the proximal portion is longer than the distal portion.

7. The method of claim 6, wherein the bend portion disposes the distal portion at a 30 degree angle from the proximal portion.

8. A method of performing therapy of a hand, comprising:

providing to a patient a therapy device having a dodecahedron portion, and a paddle portion having a proximal portion extending in a first direction, and a distal portion extending in a second direction and separated by the proximal portion by a bend portion such that an angle is defined between the first direction and the second direction;

gripping the dodecahedron portion with a hand having lesser functionality and gripping the paddle portion with a hand having greater functionality; and performing a predetermined sequence of therapeutic motions through coordinated bimanual movement activity of the therapy device, with the hand having lesser functionality moving the dodecahedron portion and the hand having greater functionality moving the paddle portion;

wherein the proximal portion defines a proximal portion center axis parallel to the first direction, and the distal portion defines a distal portion center axis parallel to the second direction, and the distal portion center axis intersects the proximal portion center axis at a location within the bend portion, and extends through a distal portion terminal tip that is spaced radially outward of the proximal portion center axis.

9. The method of claim 8, wherein the paddle portion further includes a first paddle portion and a second paddle portion separated by the bend portion.

10. The method of claim 8, wherein the therapeutic motions include rotational motions, linear motions in the x-axis, linear motions in the y-axis, linear motions in the z-axis, and combinations thereof.

11. The method of claim 8, wherein the first paddle portion has an eight sided cross sectional area.

12. The method of claim 8, wherein the first paddle portion has a four sided cross sectional area.

13. The method of claim 8 wherein the hand having greater functionality is a hand of someone other than the patient.

14. The method of claim 8, further comprising:

removing the first paddle portion from the dodecahedron portion;

attaching a second paddle portion to the dodecahedron portion;

gripping the dodecahedron portion with a hand having lesser functionality and gripping the second paddle portion with a hand having greater functionality; and performing a predetermined sequence of therapeutic motions of the dodecahedron portion and the second paddle portion.

15. The method of claim 14 wherein the first paddle portion and the second paddle portion have different cross sectional areas.

* * * * *